Aug. 14, 1928.

J. L. SHROYER 1,680,748

ELECTRICALLY HEATED DEVICE

Filed Sept. 28, 1925

Inventor:
Jacob L. Shroyer,
by Alexander F. —
His Attorney.

Patented Aug. 14, 1928.

1,680,748

UNITED STATES PATENT OFFICE.

JACOB L. SHROYER, OF OAK PARK, ILLINOIS, ASSIGNOR TO EDISON ELECTRIC APPLIANCE COMPANY, INCORPORATED, OF CHICAGO, ILLINOIS, A CORPORATION OF NEW YORK.

ELECTRICALLY-HEATED DEVICE.

Application filed September 28, 1925. Serial No. 58,972.

My invention relates to electrically heated devices and has for its object the provision of an electrically heated device of simple, rugged and inexpensive construction.

More specifically my invention relates to electrically heated appliances, such as electric flatirons, hotplates, waffle irons, and the like. It has heretofore been proposed in the construction of flatirons, and other electrically heated devices, to cast the electric heating unit in the body of the device. This forms an inexpensive and rugged construction and has the further advantage that the heating unit is brought into intimate thermal relation with the surrounding metal. With former constructions, however, it has been necessary upon failure of the heating unit to throw away a relatively costly part of the device along with the defective heating unit.

In accordance with my invention I obtain the advantages of a cast-in heating unit, while at the same time I provide for renewal of the heating unit at low cost as compared with the total cost of the device. In carrying out my invention I cast the electric heating unit in a separate part which is clamped to the heated body and may be easily removed for renewal.

Figure 1:
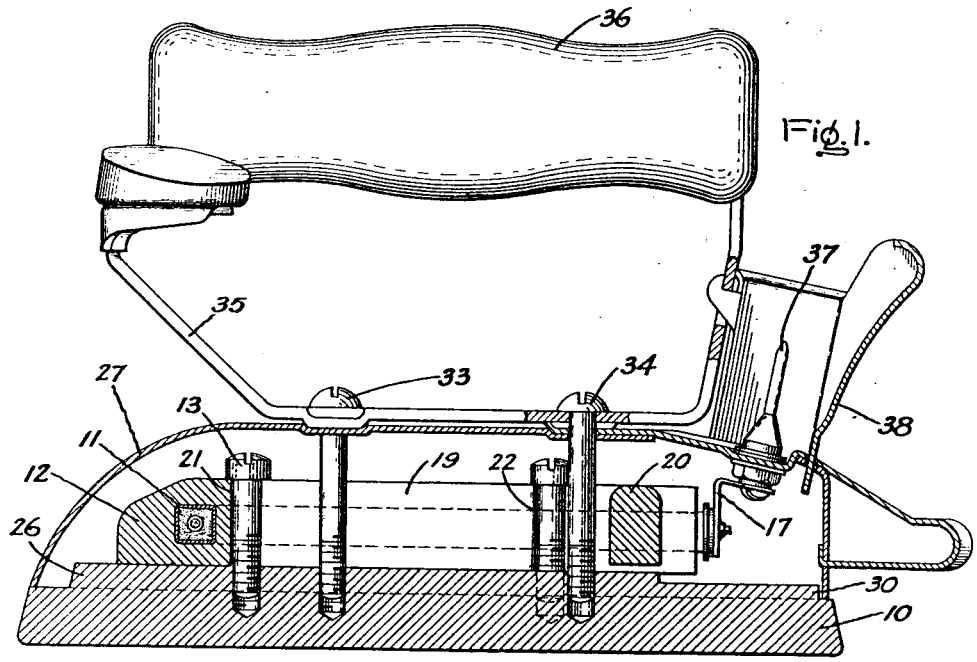
Figure 2:
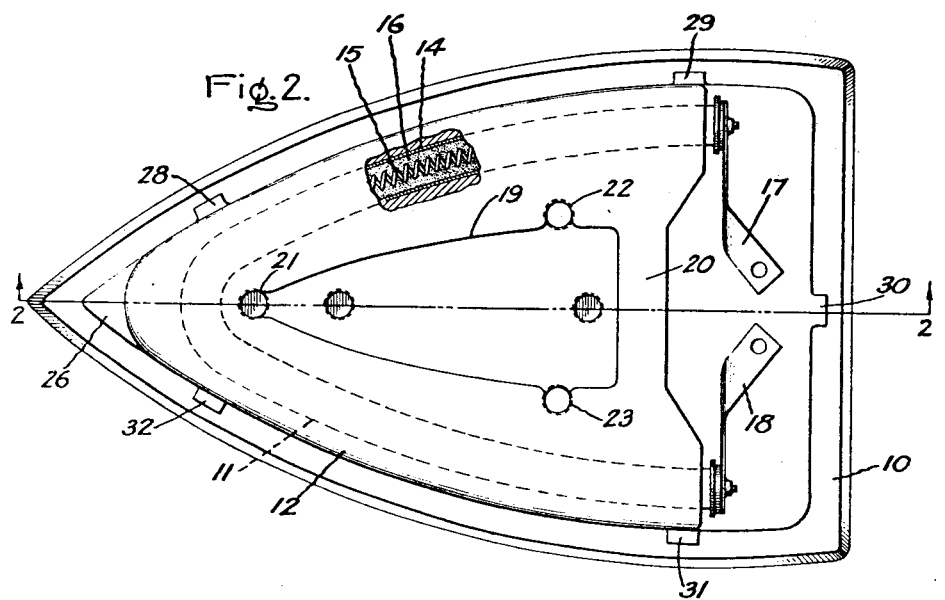

For a more complete understanding of my invention reference should be had to the accompanying drawing in which Fig. 1 is a sectional view of an electric flatiron embodying my invention, while Fig. 2 is a plan view partially in section of the flatiron shown in Fig. 1, the cover and handle being removed.

Referring to the drawing, I have shown my invention in one form as applied to an electrically heated flatiron comprising a metallic body member 10 of suitable conformation, the lower side of which is provided with an ironing surface. This body member 10 is also sometimes known as a sole plate. The body member 10 is heated by means of a resistance heating unit 11 which is cast in a separate metal plate or member 12, sometimes known as a pressure plate. As shown the member 12 has subtantially the same shape as the body member 10, but is somewhat smaller. It is clamped securely by means of screws 13 to the upper surface of the body member 10 in good heat conducting relation therewith.

The heating unit 11 is preferably of the sheathed wire type. As shown it consists of an outer metallic sheath 14 in which a helical resistance conductor 15 is embedded in compacted powdered insulating material 16. Such a heating unit is described and claimed in Patent No. 1,367,341 to Abbott dated February 1, 1921. The heating unit is substantially horseshoe shaped and extends substantially parallel with the sides of the body member 10. Its ends project from the member 12 at the heel of the flatiron and are provided with suitable terminals 17 and 18 which are electrically connected to the resistance conductor 15 but insulated from the sheath 14 and other adjacent parts. The member 12, as shown, is somewhat shorter than the body member 10 in order to provide space for the terminals at the heel of body member 10.

The member 12 has substantially the same general shape as the heating unit and provides an outer zone of thick metal in which the heating unit is cast. It is provided with a central aperture 19, and the heavy portion in which the heating unit is cast may be considered as being substantially horseshoe shaped with its ends connected mechanically by an integral bar 20. Around the aperture 19 are recesses to receive the clamping screws 13, three of these recesses 21, 22 and 23 being shown. These recesses, which take the place of holes for the screws 13, are formed upon the casting of the member 12. The contacting surfaces of the member 12 and the body member 10 are finished off smooth so as to fit each other and permit heat to be conducted freely from the plate 12 to the body member 10.

A central ledge or raised portion 26 is provided on the upper surface of the member 10, and it is on this raised portion that the plate 12 is clamped. A cover 27 made of sheet metal fits over the plate 12 and this raised portion 26, and rests on the member 10. The cover is held in position by means of lugs 28–32 inclusive, extending laterally from the raised portion 26. It is secured to the member 10 by means of clamping screws 33 and 34. These screws likewise pass through and secure a support 35 for the flatiron handle 36. A pair of contact pins 37 (only one of which is shown) are secured to the cover 27 and electrically connected to the terminals 17 and 18 respectively whereby the heating unit 11 may be connected to a suitable electrical source of supply by means of an attachment plug cooperating with the pins 37. The terminal pins are surrounded by a plug guard 38. The particular arrangement shown of the contact pins and plug guard is described and claimed in Patent No. 1,539,605 to Simmons dated May 26, 1925.

With this arrangement it will be observed that the heating unit 11 is in intimate thermal relation with the metal of the member 12 surrounding it since it is cast in the member 12, so that heat is conducted freely from the heating unit to the adjacent parts of the member 12 and the body 10. The device also has the advantage of having very few parts and these parts are very simple and rugged in construction. In case of failure of the heating unit, which is practically the only part which is subject to appreciable deterioration in use, the member 12 and the heating unit may be removed and a new part substituted. This permits the continued use of the remaining and more expensive parts of the device.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. In an electrically heated device, the combination with a member to be heated, of an insulated electric heating unit, a second metallic member in which said heating unit is cast so as to provide a zone of heavy metal surrounding said unit, and means for clamping said second member to the first in good heat conducting relation therewith.

2. In an electrically heated device, the combination with a member to be heated, of a second member made of cast metal, an electric heating unit cast in said second member, and means for removably clamping said second member on said first member in good thermal relation therewith so that said second member and said heating unit may be removed as a unit to provide for renewal of said heating unit.

3. An electric appliance comprising a member to be heated, a cast metal member fitting on said first member in good thermal relation therewith, means for removably clamping said second member on said first member, and a sheathed heating unit cast in said second member.

4. An electric flatiron comprising a sole plate, a pressure plate made of cast metal, an insulated resistance conductor cast in said pressure plate, and means for clamping said pressure plate on said sole plate in intimate thermal relation therewith.

5. An electric flatiron comprising a sole plate, an encased heating unit having substantially the same shape as said sole plate, a metallic member in which said unit is cast providing a zone of thick metal surrounding said unit, and means for securing said member to said sole plate in good heat conducting relation therewith.

6. An electric flatiron comprising a metal sole plate, a pressure plate made of cast metal, a sheathed wire heating unit cast in said pressure plate, means for clamping said pressure plate on said sole plate, a cover fitting over said pressure plate resting on said sole plates, means for securing said cover, and a handle secured to said cover.

7. An electric flatiron comprising a sole plate, a sheathed electric heating unit extending around the edge of said plate, a metallic member in which the unit is cast providing a zone of relatively thick metal surrounding said unit, said member being provided with a central aperture, and means for clamping said member on said sole plate.

8. An electric flatiron comprising a sole plate, a renewable cast-in electric heating unit therefor comprising a horseshoe-shaped heating unit, a horseshoe-shaped pressure plate cast around said heating unit and providing a zone of heavy metal surrounding said heating unit, and means for clamping said pressure plate on said sole plate.

9. An electric flatiron comprising a sole plate, an electric heating unit, a metallic horseshoe-shaped member in which said unit is cast, said member being provided with a central aperture, and means for clamping said member on said sole plate in good thermal relation therewith, comprising indentations in the inner edge of said member, and elements passing through said indentations and secured to said sole plate.

In witness whereof, I have hereunto set my hand this 23 day of September, 1925.

JACOB L. SHROYER.